United States Patent
Takatori et al.

(10) Patent No.: US 9,405,110 B2
(45) Date of Patent: Aug. 2, 2016

(54) SURFACE LIGHT SOURCE DEVICE AND DISPLAY APPARATUS

(71) Applicant: Enplas Corporation, Saitama (JP)

(72) Inventors: Hiroshi Takatori, Saitama (JP); Masao Yamaguchi, Saitama (JP)

(73) Assignee: Enplas Corporation, Saitama (JP)

( * ) Notice: Subject to any disclaimer, the term of this patent is extended or adjusted under 35 U.S.C. 154(b) by 2 days.

(21) Appl. No.: 14/604,984

(22) Filed: Jan. 26, 2015

(65) Prior Publication Data

US 2015/0211713 A1    Jul. 30, 2015

(30) Foreign Application Priority Data

Jan. 28, 2014   (JP) .................... 2014-013149
Jun. 23, 2014   (JP) .................... 2014-128061

(51) Int. Cl.
*F21V 11/00*    (2015.01)
*G02B 19/00*   (2006.01)
*F21Y 101/02*  (2006.01)

(52) U.S. Cl.
CPC ......... *G02B 19/0047* (2013.01); *F21Y 2101/02* (2013.01)

(58) Field of Classification Search
CPC ............ F21Y 2101/02; G02B 19/0047; G02F 1/133602; G02F 1/603; G02F 1/616
See application file for complete search history.

(56) References Cited

U.S. PATENT DOCUMENTS

2013/0050989 A1*  2/2013  Shen ................. G02F 1/133602
                                                              362/97.1
2014/0104816 A1*  4/2014  Takasi ............... G02F 1/133603
                                                              362/97.3

FOREIGN PATENT DOCUMENTS

JP         2009-152142 A       7/2009

* cited by examiner

*Primary Examiner* — Thomas M Sember
(74) *Attorney, Agent, or Firm* — Brundidge & Stanger, P.C.

(57) ABSTRACT

A surface light source device (100) includes substrate (120), a plurality of light emitting devices (130) disposed at constant intervals on substrate (120), and light diffusion plate (160) disposed substantially parallel to substrate (120) over the plurality of light emitting devices (130). Light emitting device (130) includes light emitting element (140) and light flux controlling member (150). A luminous intensity of light from light emitting device (130) is gradually increased as an angle relative to optical axis (LA) becomes larger in an angular range from a direction along optical axis (LA) of light emitting device (130) to a direction of emission of light with the highest luminous intensity from light emitting device (130). Surface light source device (100) satisfies three Equations of $H/P \leq 0.2$, $L/P > 1$, and $I_{1/2}/I_0 > 6$.

8 Claims, 17 Drawing Sheets

SURFACE LIGHT SOURCE DEVICE AND DISPLAY APPARATUS

CROSS REFERENCE TO RELATED APPLICATIONS

This application is entitled to and claims the benefit of Japanese Patent Application No. 2014-013149, filed on Jan. 28, 2014, and Japanese Patent Application No. 2014-128061, filed on Jun. 23, 2014, the disclosure of which including the specification, drawings and abstract is incorporated herein by reference in their entirety.

TECHNICAL FIELD

The present invention relates to a surface light source device and a display apparatus having the surface light source device.

BACKGROUND ART

Some transmission type image display apparatuses such as liquid crystal display apparatuses and signboards use a direct surface light source device as a backlight. In recent years, direct surface light source devices having a plurality of light emitting elements as the light source have been used. In such a surface light source device, there is disposed, over a light emitting element, a light flux controlling member for controlling the distribution of emission light from the light emitting element (see, for example, PTL 1).

FIGS. 1A and 1B are drawings illustrating the configuration of surface light source device (surface light emitting unit) 10 set forth in PTL 1 (see FIGS. 8A and 8B of PTL 1). FIG 1A is a perspective view of surface light source device 10, and FIG. 1B is a sectional view of surface light source device 10. As illustrated in these drawings, surface light source device 10 has housing 20, substrate (mounting plate) 30 disposed inside the housing, and a plurality of light emitting devices (light emitting units) 40 disposed at constant intervals on substrate 30. Light emitting device 40 has a light emitting element 42, and a light flux controlling member (lens part) 44 disposed over light emitting element 42. An incidence surface and an emission surface of light flux controlling member 44 are formed so as to expand the emission light from light emitting element 42. Here, it is assumed that light diffusion plate 50 is disposed at an opening of housing 20. The upper surface of light diffusion plate 50 functions as a light emitting surface.

FIG. 2 is a graph illustrating the light distribution characteristics of light emitting device 40 (see FIG. 6 of PTL 1). As illustrated in this graph, a large amount of light is emitted from light flux controlling member 44 in a larger angular range relative to the optical axis of light emitting device 40, whereas almost no light is emitted from light flux controlling member 44 in a smaller angular range relative to the optical axis of light emitting device 40. Therefore, when only one light emitting device 40 is disposed on substrate 30, the luminance of an area of the light emitting surface directly above light emitting device 40 is decreased. However, when a plurality of light emitting devices 40 are disposed on substrate 30, emission light from one light emitting device 40 reaches an area directly above the other light emitting devices 40, as illustrated in FIG. 1B. As a result, the luminance unevenness on the light emitting surface becomes smaller in surface light source device 10.

As illustrated in FIG. 1B, the center-to-center distance (pitch) between light emitting devices 40 is set as P (mm), and the interval (height) between the upper surface of substrate 30 and the lower surface of light diffusion plate 50 is set as H (mm). Referring to FIG. 8B of PTL 1 (FIG. 1B of the present application), in surface light source device 10 set forth in PTL 1, H/P is about 0.77.

CITATION LIST

Patent Literature

PTL 1
Japanese Patent Application Laid-Open No. 2009-152142

SUMMARY OF INVENTION

Technical Problem

As illustrated in FIG. 2, in order to eliminate the luminance unevenness on a light emitting surface, surface light source device 10 set forth in PTL 1 is adjusted such that the peak emission angle of light emitting device 40 is to some degree a larger angle (about 63°) relative to the optical axis of light emitting element 42. Here, the "peak emission angle" means an emission angle of light with the highest luminous intensity.

On the other hand, recently, a further reduction in the number of light emitting elements in a surface light source device and further thinning of a surface light source device (i.e., making the value of the aforementioned H/P smaller) have been demanded. However, only by adjusting the peak emission angle of light emitting device 40 as in surface light source device 10 set forth in PTL 1, a reduction in the number of light emitting elements and the thinning of the surface light source device cannot be sufficiently realized. For example, when adopting light emitting device 40 having the light distribution characteristics illustrated in FIG. 2 in surface light source device 10 having an H/P illustrated in FIG. 1B of about 0.77, the luminance unevenness on the light emitting surface may be smaller. However, according to the calculation of the present inventors, when adopting this light emitting device 40 in a surface light source device having an H/P of 0.2 or less, light emitted at the peak emission angle from certain light emitting device 40 reaches an area between that light emitting device 40 and adjacent light emitting device 40, of the lower surface of light diffusion plate 50, and light emitted from that light emitting device 40 in an angular range from 0° to the peak emission angle (most part of light emitted from light emitting device 40) fails to reach farther. Therefore, an area of the light emitting surface in the vicinity of light emitting device 40 becomes relatively brighter, causing luminance unevenness to occur (see FIG. 13). This is caused by the non-optimized light distribution characteristics of light emitting device 40 from 0° to the peak emission angle.

Thus, the conventional direct surface light source device results in having increased luminance unevenness on a light emitting surface when H/P is set to 0.2 or less. That is, in the conventional direct surface light source device, H/P cannot be set to 0.2 or less.

An object of the present invention is to provide a direct surface light source device with a light emitting element as a light source, having an H/P of 0.2 or less and having less luminance unevenness. Further, another object of the present invention is to provide a display apparatus having the surface light source device.

Solution to Problem

In order to achieve the aforementioned objects, a surface light source device of the present invention includes: a substrate; a plurality of light emitting devices, each of which includes a light emitting element and a light flux controlling member that controls a distribution of emission light from the light emitting element, the light emitting devices being disposed at constant intervals on the substrate; and a light diffusion plate disposed substantially parallel to the substrate over the plurality of light emitting devices, the light diffusion plate being configured to transmit light from the light emitting device while diffusing the light, wherein, in an angular range from a direction along an optical axis of the light emitting device to a direction of emission of light with the highest luminous intensity from the light emitting device, a luminous intensity of light from the light emitting device is gradually increased as an angle of the light relative to the optical axis becomes larger, and the following Equations 1, 2 and 3 are satisfied.

(Equation 1)

$$\frac{H}{P} \leq 0.2 \quad [1]$$

(Equation 2)

$$\frac{L}{P} > 1 \quad [2]$$

(Equation 3)

$$\frac{I_{1/2}}{I_0} > 6 \quad [3]$$

where P is a center-to-center distance between the light emitting devices adjacent to each other, H is an interval between the upper surface of the substrate and the lower surface of the light diffusion plate, L is a distance from the intersection point of the optical axis and the lower surface of the light diffusion plate to the point where the light with the highest luminous intensity reaches the lower surface of the light diffusion plate, $I_0$ is a luminous intensity of light emitted in the optical axis direction from the light emitting device, and $I_{1/2}$ is a luminous intensity of light emitted from the light emitting device toward the point of a distance P/2 from the intersection point of the optical axis and the lower surface of the light diffusion plate, on the lower surface of the light diffusion plate.

A display apparatus of the present invention has a surface light source device of the present invention, and a member to be irradiated with light from the surface light source device.

Advantageous Effects of Invention

According to the present invention, there can be provided a thin surface light source device and a display apparatus with less energy consumption.

DESCRIPTION OF EMBODIMENT

In the following, an embodiment of the present invention will be described in detail with reference to the accompanying drawings. Here, as a typical example of the surface light source device of the present invention, a surface light source device suitable as a backlight of a liquid crystal display apparatus will be described. When used with a member (for example, liquid crystal panel) to be irradiated with light from the surface light source device, the surface light source device can be used as a display apparatus.

[Configurations of Surface Light Source Device and Light Emitting Device]

Figure 3A:
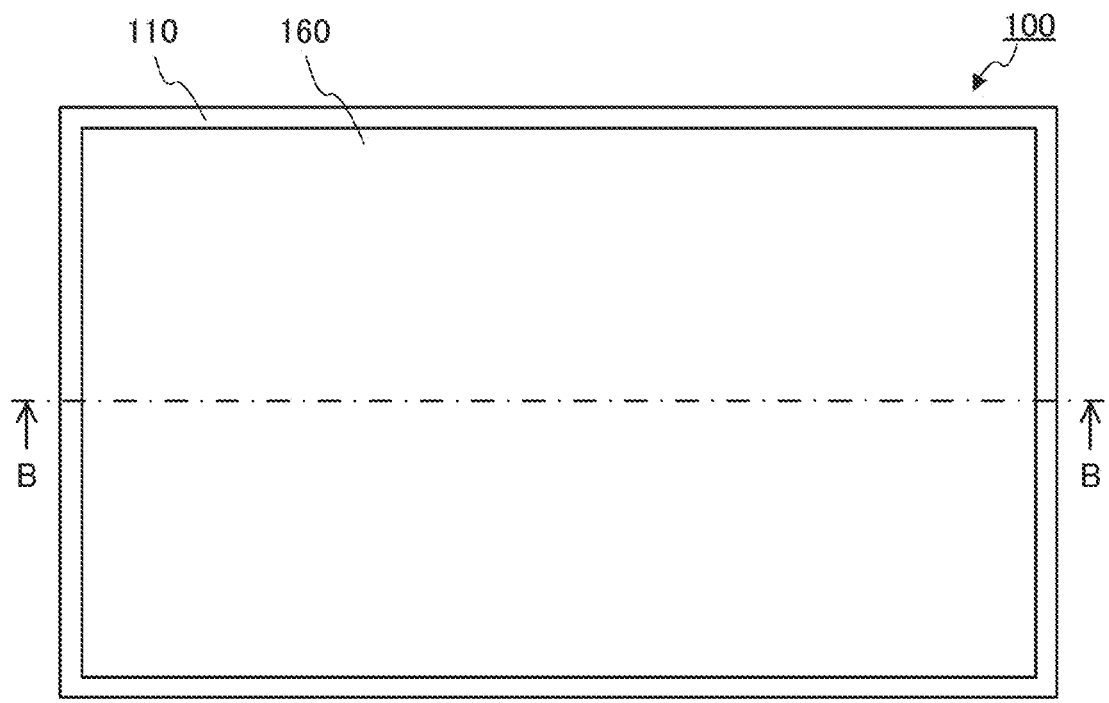
FIGS. 3A and 3B are drawings illustrating the configuration of a surface light source device according to an embodiment.
Figure 3B:
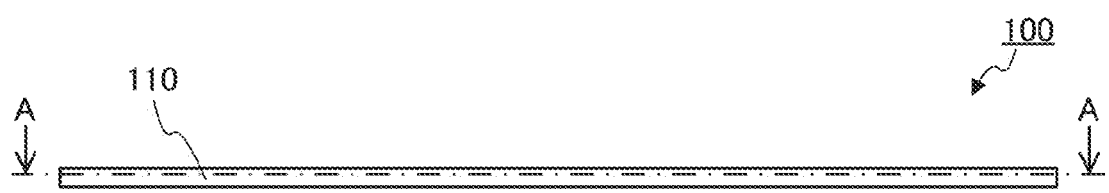
Figure 4A:
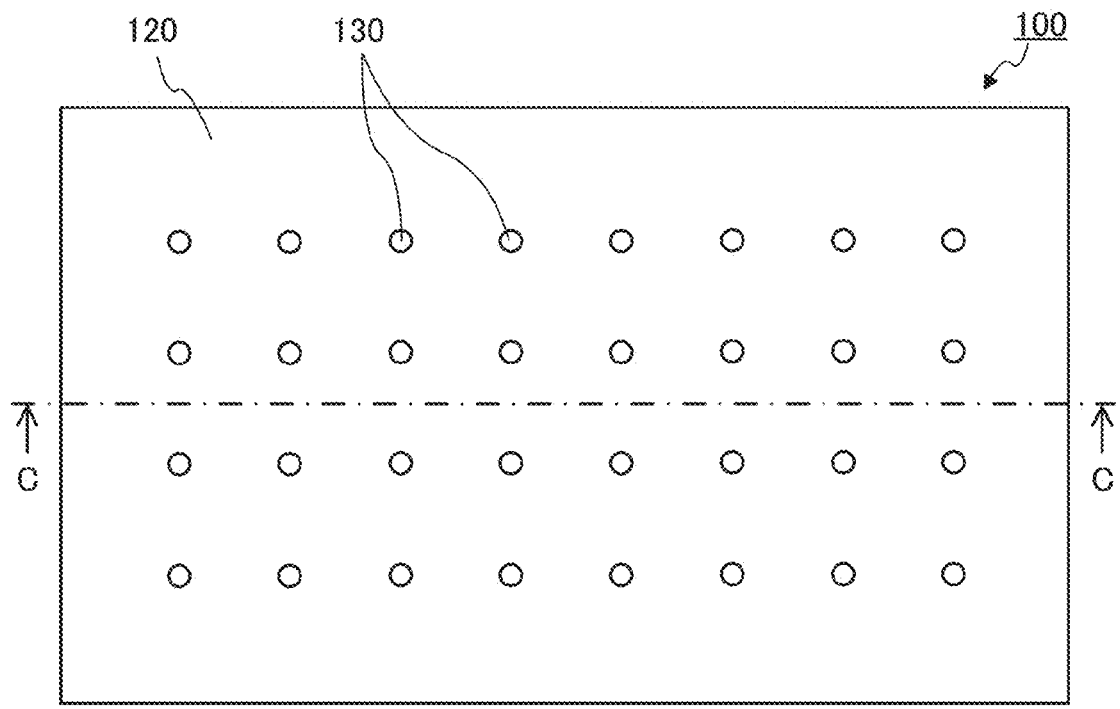
FIGS. 4A and 4B are sectional views illustrating the configuration of a surface light source device according to the embodiment.
Figure 4B:
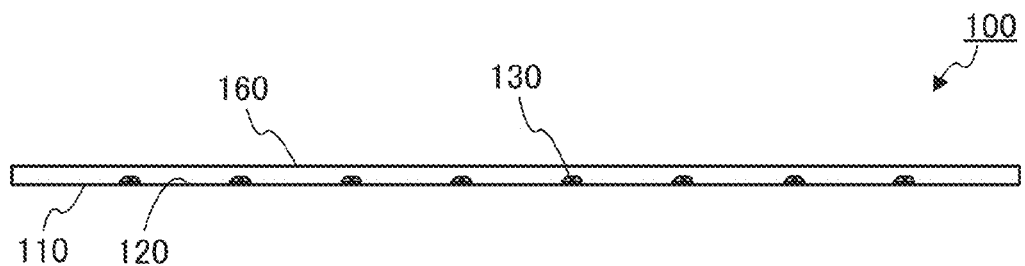
Figure 5:
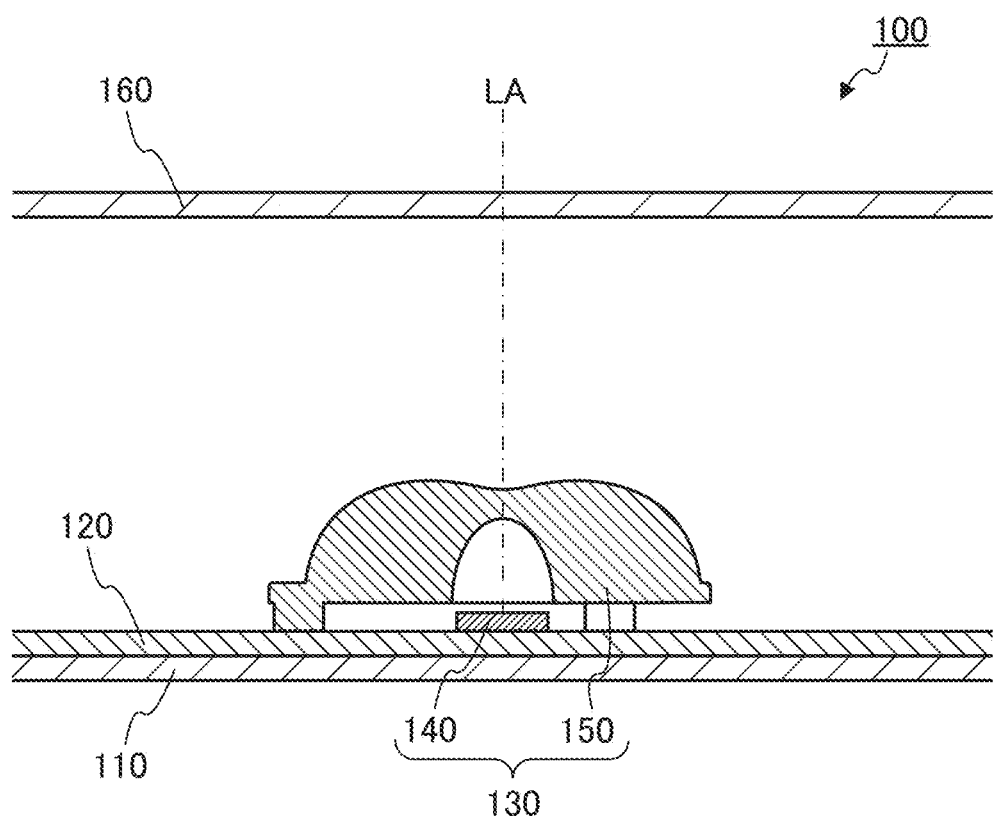
FIG. 5 is a partially enlarged sectional view in which a part of FIG. 4B is enlarged.

FIGS. 3A and 3B to 5 are drawings illustrating the configuration of surface light source device 100 according to an embodiment of the present invention. FIG. 3A is a plan view, and FIG. 3B is a front view. FIG. 4A is a sectional view taken along line A-A illustrated in FIG. 3B, and FIG. 4B is a sectional view taken along line B-B illustrated in FIG. 3A and line C-C illustrated in FIG. 4A. FIG. 5 is a partially enlarged sectional view in which a part of FIG. 4B is enlarged.

As illustrated in FIGS. 3A and 3B and 4A and 4B, surface light source device 100 of the present embodiment has housing 110, substrate 120, a plurality of light emitting devices 130 and light diffusion plate 160. Substrate 120 is disposed on the bottom plate of housing 110, and the plurality of light emitting devices 130 are disposed at constant intervals on substrate 120. An opening is provided at the top plate of housing 110. Light diffusion plate 160 is disposed substantially parallel to substrate 120 over the plurality of light emitting devices 130 so as to cover the opening, and functions as a light emitting surface. While the size of the light emitting surface is not particularly limited, the size is for example about 400 mm×about 700 mm. The center-to-center distance (pitch) between light emitting devices 130 is P (mm), and the interval (height) between the upper surface of substrate 120 and the lower surface of light diffusion plate 160 is H (mm) (see FIG. 7). Surface light source device 100 according to the present embodiment satisfies the following Equation 1.

(Equation 1)

$$\frac{H}{P} \leq 0.2 \quad [4]$$

As illustrated in FIG. 5, each of the plurality of light emitting devices 130 is fixed on substrate 120. Each of the plurality of light emitting devices 130 has light emitting element 140 and light flux controlling member 150.

Light emitting element 140 is a light source of surface light source device 100. Light emitting element 140 is a light-emitting diode (LED) such as a white light-emitting diode, for example.

Light flux controlling member 150 controls the distribution of light emitted from light emitting element 140. Light flux controlling member 150 is disposed over light emitting element 140 such that its central axis coincides with the optical axis of light emitting element 140. Here, the "optical axis of light emitting element" means the central light beam of a stereoscopic emission light flux from light emitting element 140. Optical axis LA of light emitting device 130 coincides with the optical axis of light emitting element 140 and the central axis of light flux controlling member 150 (see FIG. 5). Between substrate 120 and light flux controlling member 150, there is defined a gap for releasing heat emitted from light emitting element 140 to the outside.

Light flux controlling member 150 is formed by integral molding. The material for light flux controlling member 150 is not particularly limited as long as the light of a desired wavelength can pass through the material. The material for light flux controlling member 150 is, for example, a light transmissive resin such as polymethylmethacrylate (PMMA), polycarbonate (PC) or epoxy resin (EP), or glass. The shape of light flux controlling member 150 will be separately described in detail.

Light diffusion plate 160 is a plate-like member having a light diffusing property, and transmits emission light from light emitting device 130 while diffusing it. Typically, the size of light diffusion plate 160 is substantially the same as that of a member to be irradiated, such as a liquid crystal panel. For example, light diffusion plate 160 is formed of light transmissive resins such as polymethylmethacrylate (PMMA), polycarbonate (PC), polystyrene (PS), or styrene methyl methacrylate copolymerization resin (MS). In order to provide a light diffusing property, fine irregularities are formed on the surface of light diffusion plate 160, or light diffusers such as beads are dispersed inside light diffusion plate 160.

Light from light emitting element 140 is expanded in radial directions (surface directions of substrate 120) by light flux controlling member 150. Light emitted from light emitting device 130 reaches light diffusion plate 160. Light having reached light diffusion plate 160 is transmitted through light diffusion plate 160 while being diffused.

[Configuration of Light Flux Controlling Member]

Figure 6A:
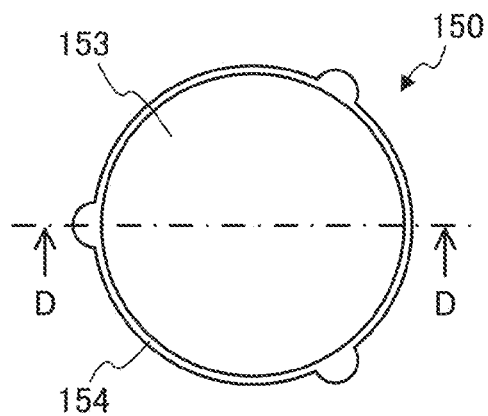
FIGS. 6A to 6E are drawings illustrating the configuration of a light flux controlling member according to an embodiment.
Figure 6C:
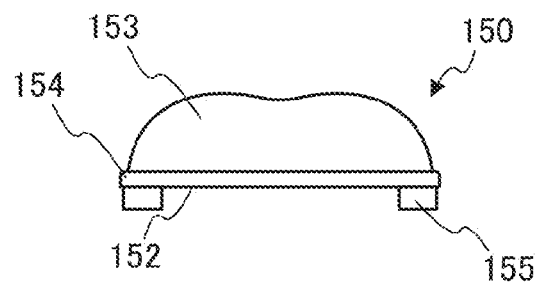
Figure 6B:
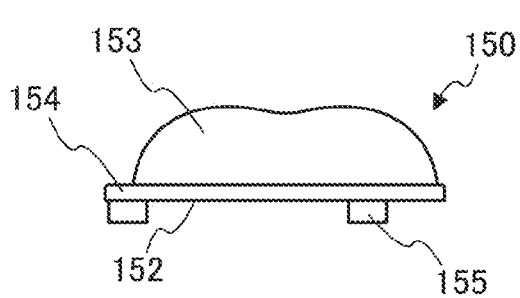
Figure 6D:
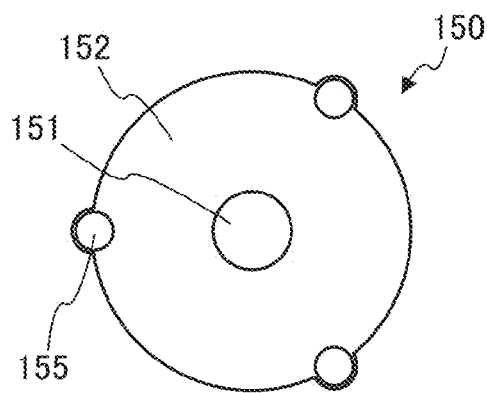
Figure 6E:
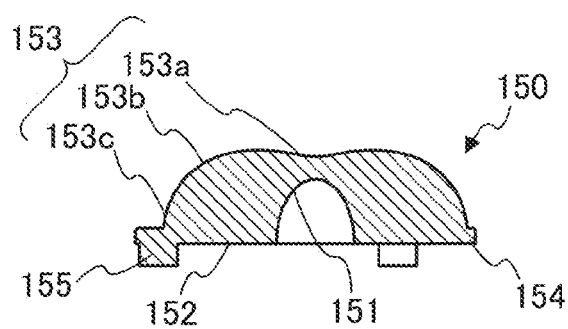

FIGS. 6A to 6E are drawings illustrating the configuration of light flux controlling member 150 according to the present embodiment. FIG. 6A is a plan view of light flux controlling member 150, FIG. 6B is a front view of light flux controlling member 150, FIG. 6C is a side view of light flux controlling member 150, and FIG. 6D is a bottom view of light flux controlling member 150. In addition, FIG. 6E is a sectional view taken along line D-D illustrated in FIG. 6A.

As illustrated in FIGS. 6A to 6E, light flux controlling member 150 has incidence surface 151, rear surface 152, emission surface 153, flange 154, and a plurality of legs 155.

Incidence surface 151 is a recessed internal surface formed so as to face light emitting element 140 at the central portion of the lower side (light emitting element 140 side) of light flux controlling member 150. The shape of incidence surface 151 is such a recessed shape that a part of spheroid surface is cut off. Incidence surface 151 allows light emitted from light emitting element 140 to enter light flux controlling member 150 while controlling its traveling direction.

Rear surface 152 is a plane positioned at the lower side (light emitting element 140 side) of light flux controlling member 150 and extending in the radial direction from the opening edge of the recess.

Emission surface 153 emits light having entered light flux controlling member 150 toward the outside while controlling its traveling direction. Emission surface 153 is a rotational symmetry plane around the central axis of light flux controlling member 150, and is protruded upward (light diffusion plate 160 side) beyond flange 154.

According to the present embodiment, emission surface 153 has first emission surface 153a positioned within a predetermined range around the central axis of light flux controlling member 150, second emission surface 153b formed continuously around first emission surface 153a, and a third emission surface 153c connecting second emission surface 153b and flange 154 (see FIG. 6E). First emission surface 153a is a smooth curved surface (recessed curved surface) being convex downward (light emitting element 140 side) disposed at a position intersecting the central axis (optical axis LA of light emitting device 130) of light flux controlling member 150. The shape of first emission surface 153a is such a recessed shape that a part of spherical surface is cut off.

Second emission surface 153b is a smooth curved surface (convex curved surface) being convex upward (light diffusion plate 160 side) positioned around first emission surface 153a. The shape of second emission surface 153b is such a convex shape that a part of toxic surface is cut off. Third emission surface 153c is a curved surface positioned around second emission surface 153b. In the sectional view as illustrated in FIG. 6E, the section of third emission surface 153c may be either linear or curved.

Flange 154 is positioned between the outer peripheral portion of emission surface 153 and the outer peripheral portion of rear surface 152, and is protruded outward in the radial direction. The shape of flange 154 is substantially toric. Flange 154 is not always necessary, but, by providing flange 154, it becomes easier to handle and align light flux controlling member 150. The thickness of flange 154 is not particularly limited, and is determined taking account of an area required for emission surface 153, the molding property of flange 154, or the like.

The plurality of legs 155 are cylindrical members protruding downward (light emitting element 140 side) from rear surface 152 at the outer peripheral portion of rear surface 152. The plurality of legs 155 support light flux controlling member 150 such that it is positioned properly relative to light emitting element 140.

Light from light emitting element 140 enters light flux controlling member 150 through incidence surface 151. At that time, light from light emitting element 140 is expanded in radial directions (directions orthogonal to the optical axis of light emitting element 140) due to the shape of incidence surface 151. Light having entered light flux controlling member 150 is emitted toward the outside through emission surface 153. Also at that time, light from light emitting element 140 is further expanded in radial directions (directions orthogonal to the optical axis of light emitting element 140) due to the shape of emission surface 153. As a result, light is emitted in a larger angular range (from 0° to nearly 90° relative to the optical axis) from light emitting device 130 (see FIG. 8A). In the angular range (range from 0° to the peak emission angle) from the direction along optical axis LA of light emitting device 130 to the direction of emission of light with the highest luminous intensity from light emitting device 130, the luminous intensity of light from light emitting device 130 is gradually increased as an angle relative to optical axis LA becomes larger (see FIG. 8A).

Figure 7:
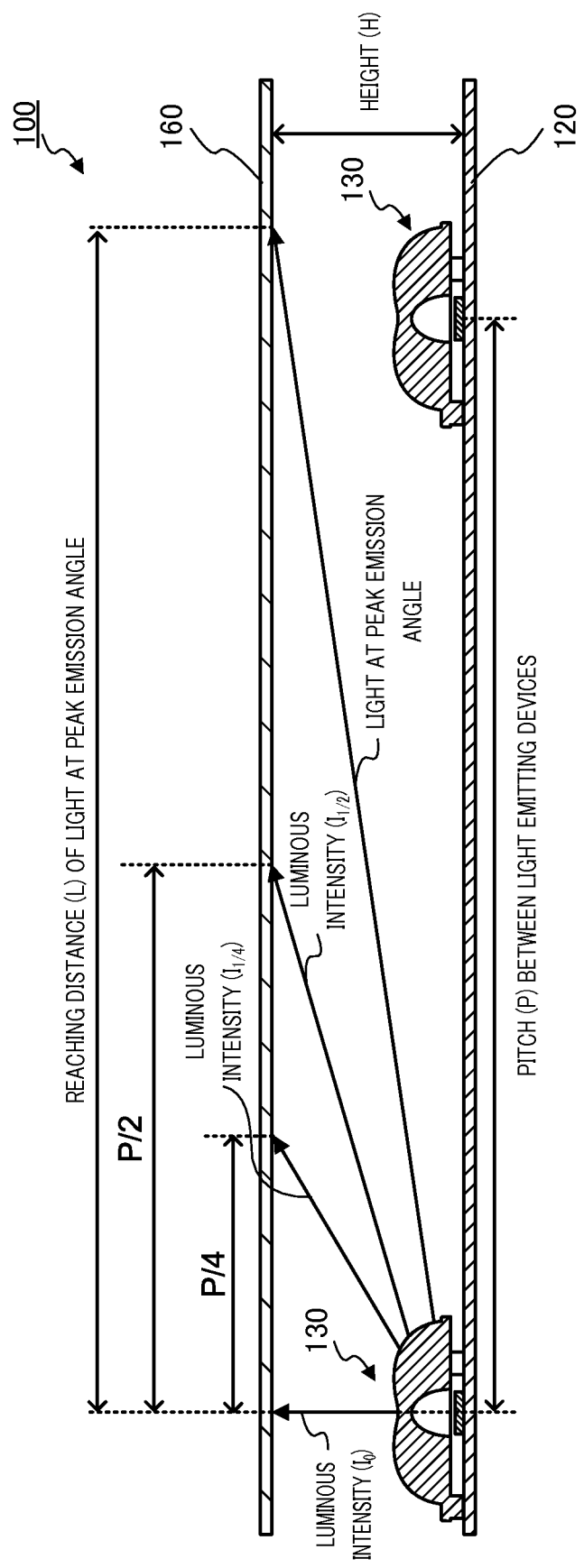
FIG. 7 is a partially enlarged sectional view of a surface light source device according to the embodiment for explaining Equations 1, 2, 3 and 4.

FIG. 7 is a partially enlarged sectional view of surface light source device 100 according to the present embodiment. In this drawing, housing 110 is omitted. As described above, surface light source device 100 according to the present embodiment satisfies the following Equation 1.

(Equation 1)

$$\frac{H}{P} \leq 0.2 \quad [5]$$

where P is a center-to-center distance (pitch) between the light emitting devices 130 adjacent to each other, and H is an interval (height) between the upper surface of substrate 120 and the lower surface of light diffusion plate 160.

Further, surface light source device 100 satisfies the following Equation 2 in order to prevent the occurrence of luminance unevenness on the light emitting surface, while satisfying the aforementioned Equation 1. That is, the shapes of incidence surface 151 and emission surface 153 of light flux controlling member 150 are adjusted so as to satisfy the following Equation 2. As illustrated in FIG. 7, Equation 2 means that light emitted at the peak emission angle from certain light emitting device 130 reaches farther than adjacent light emitting device 130. Thereby, it becomes possible to reduce the occurrence of a bright part (area having a relatively higher luminance) in an area between light emitting devices 130 of the light emitting surface. Since Equation 2 is satisfied, the emission angle of light with the highest luminous intensity (peak emission angle), of an emission angle of light emitted from light emitting device 130 (optical axis direction: 0°, substrate surface direction: 90°), is more than 78.7°.

(Equation 2)

$$\frac{L}{P} > 1 \quad [6]$$

where P is a center-to-center distance (pitch) between the light emitting devices 130 adjacent to each other, and L is a distance from the intersection point of optical axis LA of light emitting device 130 and the lower surface of light diffusion plate 160 to the point where light emitted at the peak emission angle from light emitting device 130 reaches the lower surface of light diffusion plate 160.

Further, surface light source device 100 also satisfies the following Equation 3 in order to prevent the occurrence of luminance unevenness, while satisfying the aforementioned Equation 1. That is, the shapes of incidence surface 151 and emission surface 153 of light flux controlling member 150 are adjusted so as to satisfy the following Equation 3. As illustrated in FIG. 7, Equation 3 means that the luminous intensity ($I_{1/2}$) of light propagating toward the intermediate point between two light emitting devices 130 on the lower surface of light diffusion plate 160 is six times higher than the luminous intensity ($I_0$) of light propagating toward directly above light emitting device 130. Thereby, it becomes possible to reduce the occurrence of a dark part (area having a relatively lower luminance) in an area between light emitting devices 130 of the light emitting surface.

(Equation 3)

$$\frac{I_{1/2}}{I_0} > 6 \quad [7]$$

where $I_0$ is a luminous intensity of light emitted in the direction of optical axis LA from light emitting device 130, and $I_{1/2}$ is a luminous intensity of light emitted from light emitting device 130 toward the point of a distance P/2 from the intersection point of optical axis LA and the lower surface of light diffusion plate 160, on the lower surface of light diffusion plate 160.

Further, preferably, surface light source device 100 also satisfies the following Equation 4. That is, it is preferable that the shapes of incidence surface 151 and emission surface 153 of light flux controlling member 150 are adjusted so as to satisfy the following Equation 4. As illustrated in FIG. 7, Equation 4 means that the luminous intensity ($I_{1/4}$) of light propagating toward the intermediate point (point of P/4) between the intermediate point between two light emitting devices 130 and one light emitting device 130 on the lower surface of light diffusion plate 160 is 2.4 times as high as or lower than 2.4 times of the luminous intensity ($I_0$) of light propagating toward directly above that light emitting device 130. Thereby, it becomes possible to reduce the occurrence of a bright part (area having a relatively higher luminance) in an area in the vicinity of light emitting device 130 of the light emitting surface, allowing the luminance distribution on the light emitting surface to be more uniform.

(Equation 4)

$$\frac{I_{1/4}}{I_0} \leq 2.4 \quad [8]$$

where $I_0$ is a luminous intensity of light emitted in the direction of optical axis LA from light emitting device 130 ($I_0 \neq 0$), and $I_{1/4}$ is a luminous intensity of light emitted from light emitting device 130 toward the point of a distance P/4 from the intersection point of optical axis LA and the lower surface of light diffusion plate 160, on the lower surface of light diffusion plate 160.

[Light Distribution Characteristics of Light Emitting Device and Luminance Distribution of Surface Light Source Device]

The light distribution characteristics of light emitting device 130 to be used in surface light source device 100 according to the present embodiment were measured. In addition, for comparison, light distribution characteristics were measured also for conventional light emitting devices to be used in conventional surface light source devices. Light emitting device 130 according to the present embodiment differs from the conventional light emitting device only in the shape of an emission surface of the light flux controlling member. The characteristics of light emitting device 130 according to the present embodiment and three types of conventional light emitting devices are shown in Table 1.

TABLE 1

| Segment | Example | Comparative Example | | |
|---|---|---|---|---|
| Name | P110 | P60 | P75 | P90 |
| Optimum Pitch | 110 mm | 60 mm | 75 mm | 90 mm |
| Peak Emission Angle | 81° | 72° | 75° | 77° |
| Luminous Intensity at Peak Emission Angle | 59 cd | 38 cd | 43 cd | 53 cd |
| Luminous Intensity at 0° ($I_0$) | 2.5 cd | 3.3 cd | 2.8 cd | 2.9 cd |

Figure 8A:
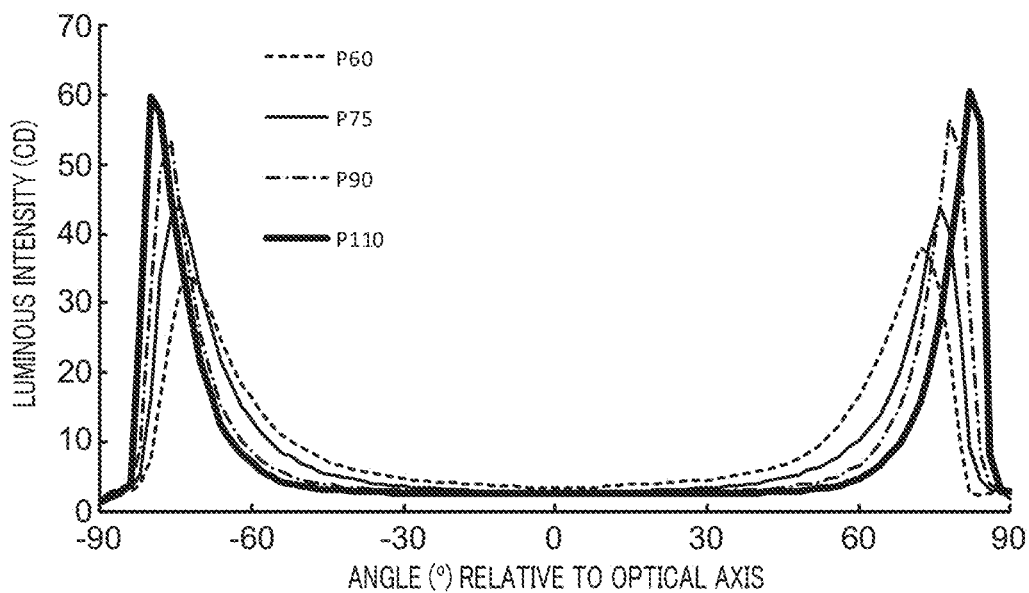
FIGS. 8A and 8B are graphs illustrating the light distribution characteristics of four types of light emitting devices.
Figure 8B:
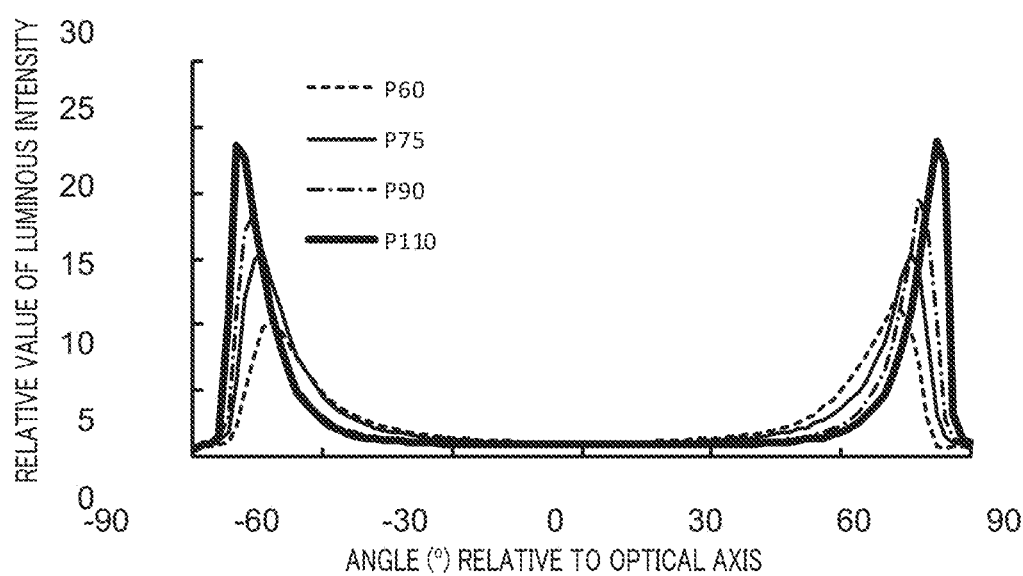

FIGS. 8A and 8B are graphs illustrating the light distribution characteristics of four types of light emitting devices (P110, P60, P75 and P90) shown in Table 1. The abscissa indicates an angle when the center of the light emitting surface of the light emitting element is defined as the origin and optical axis LA of the light emitting device is set to 0°. The ordinate indicates a luminous intensity (FIG. 8A) or a relative luminous intensity (FIG. 8B) at each angle. FIG. 8B indicates a relative luminous intensity when the luminous intensity at 0° is set to 1 in each light emitting device. The results for light emitting device 130 (P110) according to the present embodiment are indicated by a thick solid line. On the other hand, the measurement results for light emitting devices (P60, P75 and P90) of the comparative examples are indicated by a thin broken line, a thin solid line or a thin dashed line.

From these graphs, it can be observed that light emitting device 130 (P110) of the present embodiment has a peak emission angle of 78.7° or more, and can generate more amount of light that propagates toward a distant area compared to the light emitting devices (P60, P75 and P90) of the comparative examples.

Next, the luminance distribution of surface light source device 100 having light emitting device 130 (P110) of the present embodiment was measured. In addition, for comparison, luminance distributions were measured also for surface light source devices having the aforementioned light emitting devices (P60, P75 and P90) of the comparative examples. The light emitting devices (P10, P60, P75 and P90) were disposed at the respective optimum pitches (see Table 1) inside the surface light source devices having a height H of 19 mm.

Figure 9:
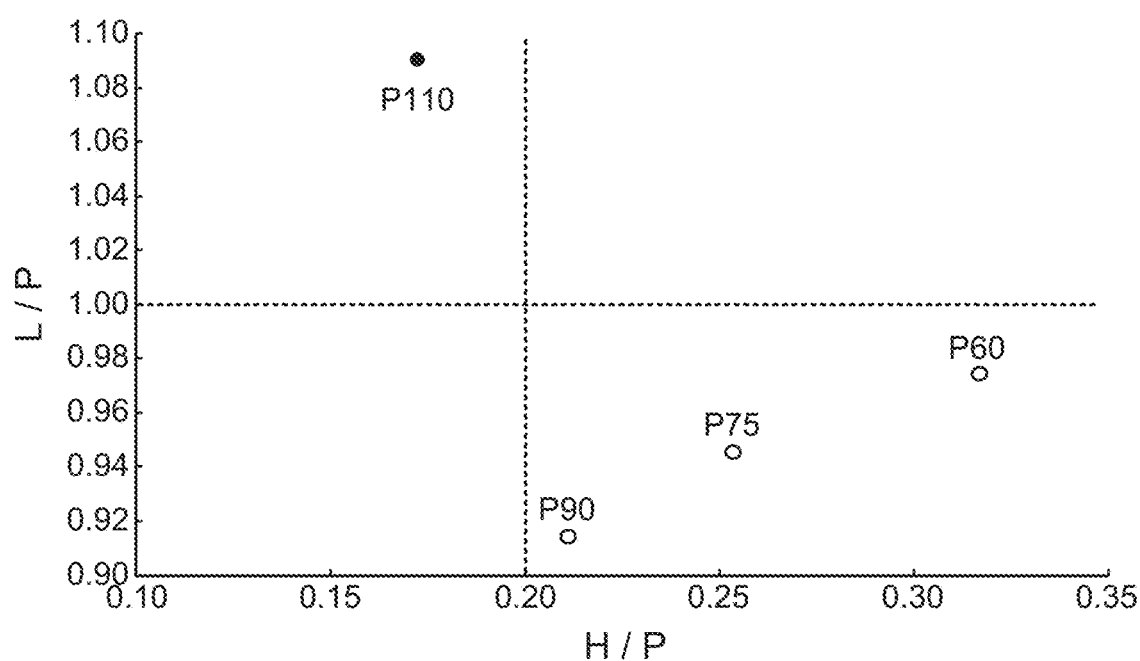
FIG. 9 is a graph illustrating the values of H/P and L/P of four types of surface light source devices.

FIG. 9 is a graph illustrating values of H/P and L/P of each of the surface light source devices. As illustrated in this graph, in surface light source device 100 according to the present embodiment, H/P is 0.2 or less, and L/P is more than 1. That is, surface light source device 100 according to the present embodiment satisfies the aforementioned Equations 1 and 2. On the other hand, surface light source devices having the light emitting devices (P60, P75 and P90) of the comparative examples have an H/P of more than 0.2, and an L/P of 1 or less. That is, neither of these surface light source devices satisfies the aforementioned Equations 1 and 2.

Figure 10A:
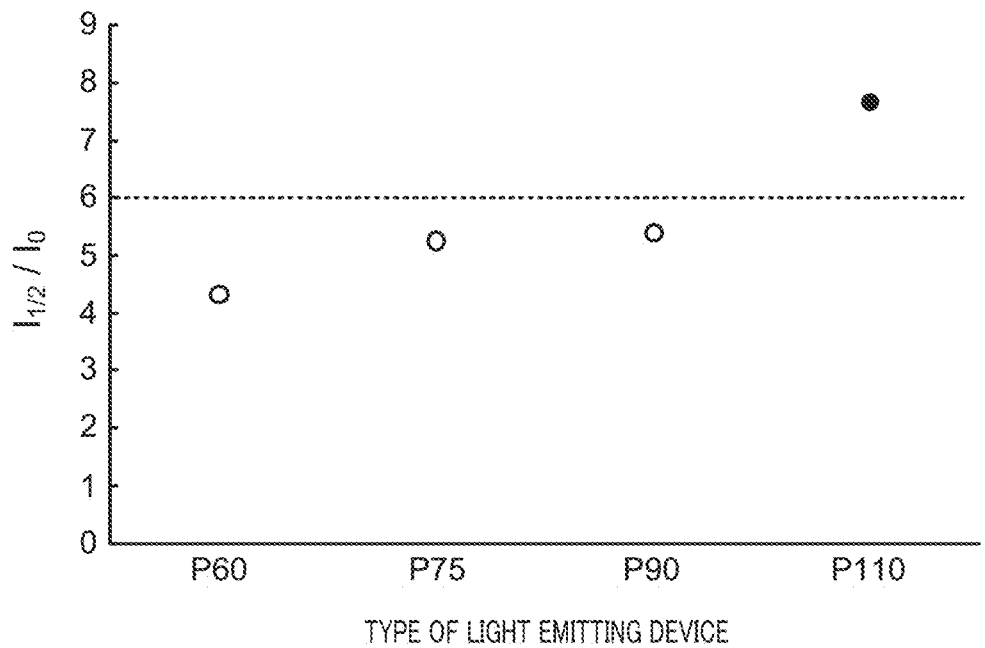
FIG. 10A is a graph illustrating the values of $I_{1/2}/I_0$ of four types of surface light source devices.
Figure 10B:
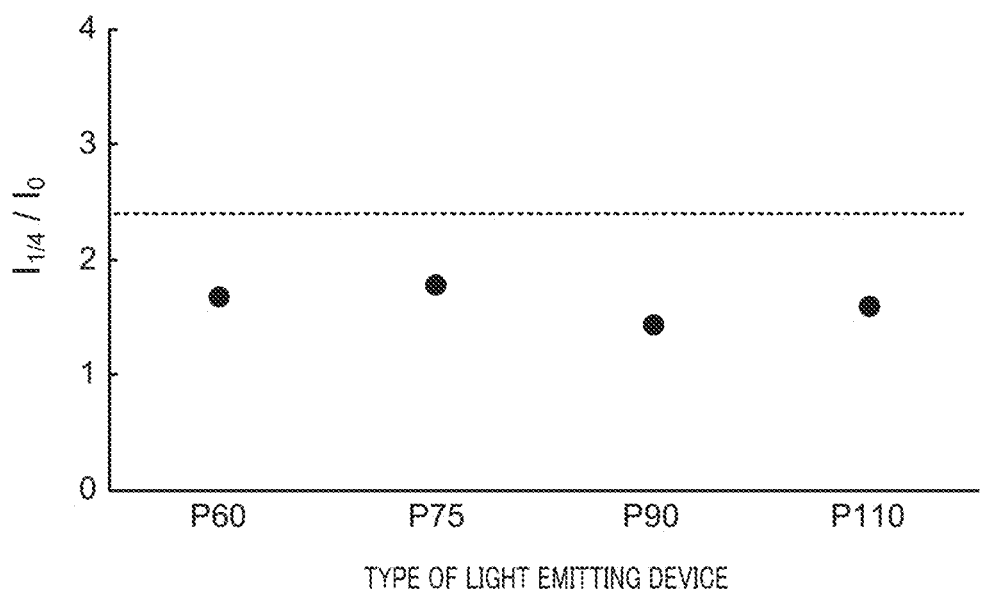
FIG. 10B is a graph illustrating the values of $I_{1/4}/I_0$ of four types of surface light source devices.

FIG. 10A is a graph illustrating the value of $I_{1/2}/I_0$ of each of the surface light source devices, and FIG. 10B is a graph illustrating the value of $I_{1/4}/I_0$ of each of the surface light source devices. As illustrated in these graphs, in surface light source device 100 according to the present embodiment, $I_{1/2}/I_0$ is more than 6, and $I_{1/4}/I_0$ is 2.4 or less. That is, surface light source device 100 according to the present embodiment satisfies the aforementioned Equations 3 and 4. On the other hand, in surface light source devices having the light emitting devices (P60, P75 and P90) of the comparative examples, $I_{1/4}/I_0$ is 2.4 or less, while $I_{1/2}/I_0$ is 6 or less. That is, these surface light source devices satisfy the aforementioned Equation 4, but do not satisfy the aforementioned Equation 3.

Figure 11A:
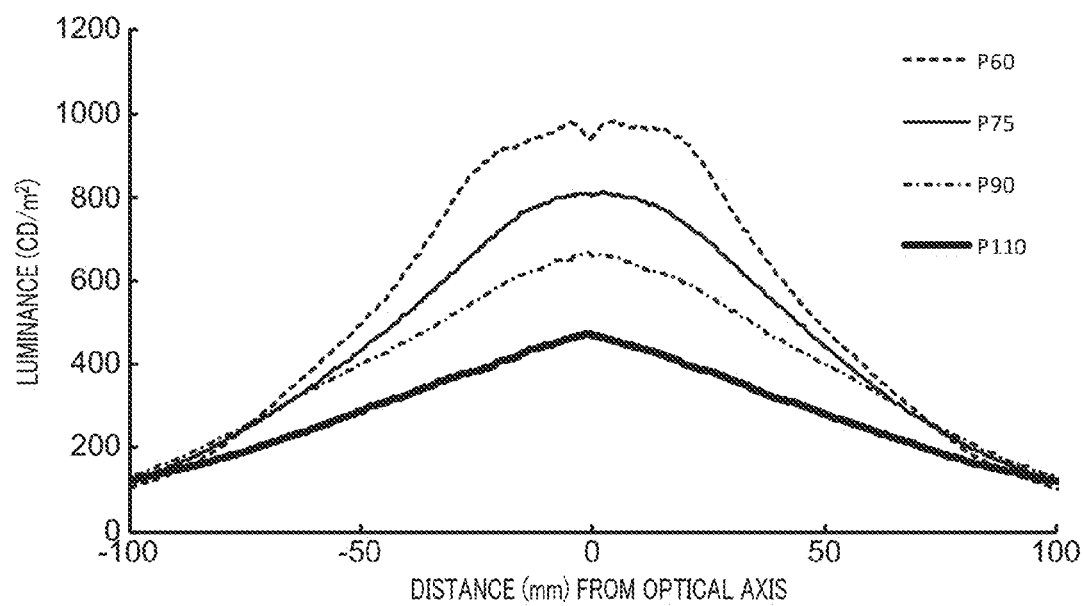
FIGS. 11A and 11B are graphs illustrating the luminance distributions of a light emitting surface when only one light emitting device is lighted in four types of surface light source devices.
Figure 11B:
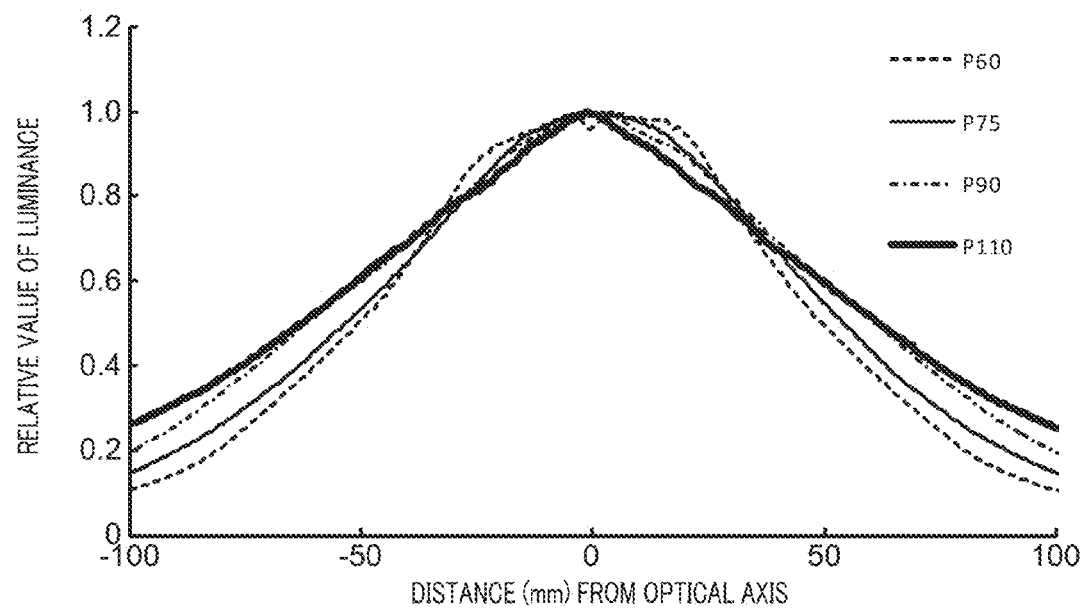

FIGS. 11A and 11B are graphs illustrating luminance distributions of the light emitting surface when only one light emitting device is lighted in each of the surface light source devices. The abscissa indicates a distance from optical axis LA of the light emitting device. The ordinate indicates a luminance (FIG. 11A) or a relative luminance (FIG. 11B) at each point. FIG. 11B indicates a relative luminance when the luminance on optical axis LA is set to 1 in each of the surface light source devices. The results for the surface light source device having light emitting device 130 (P110) according to the present embodiment are indicated by a thick solid line. On the other hand, the measurement results for the surface light source devices having light emitting devices (P60, P75 and P90) of the comparative examples are indicated by a thin broken line, a thin solid line or a thin dashed line.

From the graph illustrated in FIG. 11B, it can be observed that, when light emitting devices 130 (P110) are disposed at 110 mm pitch (H/P=0.17), sufficient brightness is obtained at the intermediate position (±55 mm) between light emitting devices 130 on the light emitting surface, whereas, when the light emitting devices (P60 and P75) of the comparative examples are disposed at 110 mm pitch (H/P=0.17), brightness is insufficient at the intermediate position (±55 mm). Further, when the light emitting devices are disposed in a matrix manner at 110 mm pitch (H/P=0.17), the center-to-center distance between light emitting devices in a diagonal direction is about 155 mm. When the light emitting devices (P90) of the comparative example are disposed at 110 mm pitch (H/P=0.17), brightness is insufficient at the intermediate position (±77.5 mm) in a diagonal direction on the light emitting surface. In contrast thereto, it can be observed that, in light emitting device 130 according to the present embodiment, sufficient luminance can be obtained even in the tails of the luminance distribution on the light emitting surface.

Figure 12A:
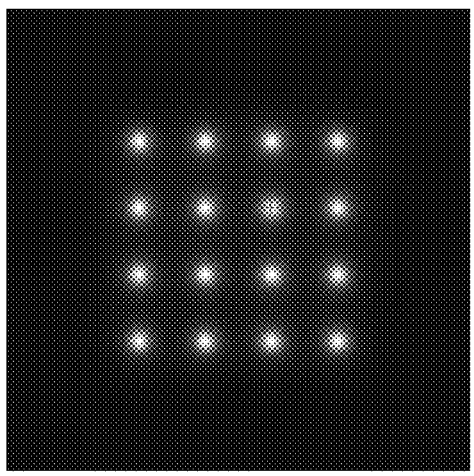
FIG. 12A is a drawing illustrating the luminance distribution of a light emitting surface of a surface light source device not having a light flux controlling member.
Figure 12B:
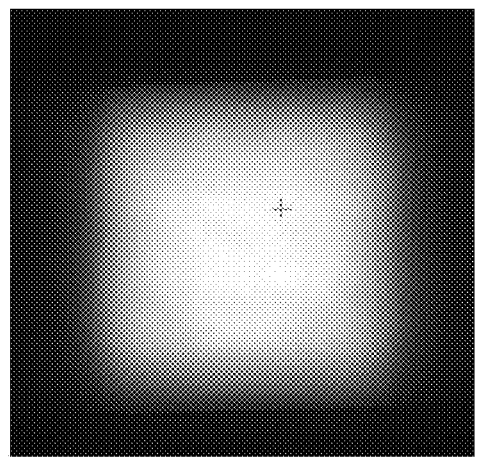
FIG. 12B is a drawing illustrating the luminance distribution of a light emitting surface of a surface light source device according to the embodiment of the present invention (H/P≤0.2, L/P>1, $I_{1/2}/I_0$>6, $I_{1/4}/I_0$≤2.4)
Figure 12C:
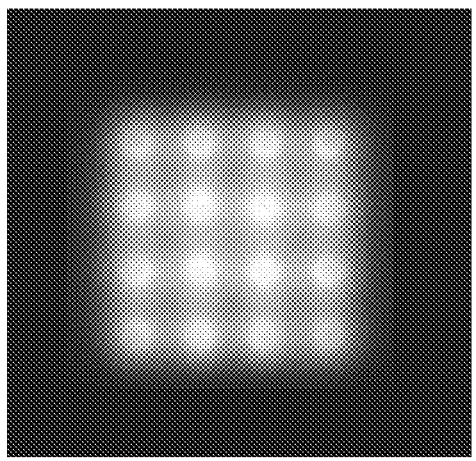
FIGS. 12C to 12E are drawings illustrating the luminance distribution of a light emitting surface of a surface light source device of a comparative example (H/P≤0.2, L/P≤1, $I_{1/2}/I_0$≤6, $I_{1/4}/I_0$≤2.4)
Figure 12D:
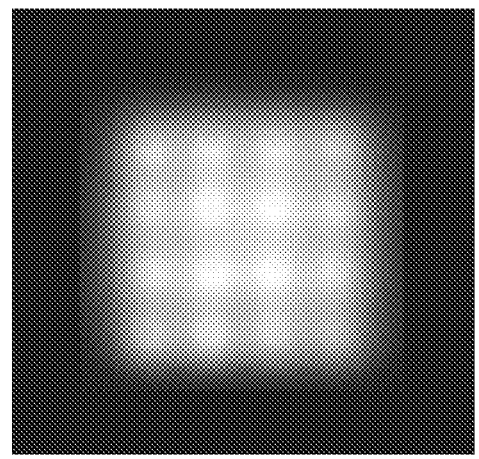
Figure 12E:
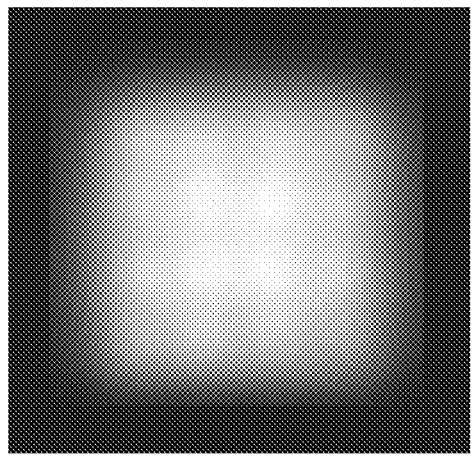

FIGS. 12A to 12D are luminance distributions of the light emitting surface when sixteen light emitting devices are lighted in each of the surface light source devices. FIG. 12A is a graph illustrating a luminance distribution of the light emitting surface when the light flux controlling member is removed, FIG. 12B is a luminance distribution of the light emitting surface of surface light source device 100 according to the present embodiment, FIG. 12C is a luminance distribution of the light emitting surface of the surface light source device having the light emitting device (P60) of the comparative example, FIG. 12D is a luminance distribution of the light emitting surface of the surface light source device having the light emitting device (P75) of the comparative example, and FIG. 12E is a luminance distribution of the light emitting surface of the surface light source device having the light emitting device (P90) of the comparative example. The respective light emitting devices are disposed at the pitch of 110 mm inside the surface light source device having a height H of 19 mm, and H/P is 0.17 in any of the surface light source devices.

As illustrated in FIGS. 12C to 12E, in the surface light source devices (H/P≤0.2, L/P≤1, $I_{1/2}/I_0 \le 6$, $I_{1/4}/I_0 \le 2.4$) having the light flux controlling member of the comparative example, luminance unevenness was larger. In contrast thereto, in surface light source device 100 (H/P≤0.2, L/P>1, $I_{1/2}/I_0 > 6$, $I_{1/4}/I_0 \le 2.4$) according to the present embodiment, luminance unevenness was smaller, despite the fact that H/P was 0.2 or less as illustrated in FIG. 12B. Here, the phrase "luminance unevenness was smaller" means that the ratio of the minimum luminance relative to the maximum luminance in an area between light emitting devices of the light emitting surface is 95% or more.

As has been described, surface light source device 100 according to the present embodiment can emit uniform light from the light emitting surface despite the fact that H/P is 0.2 or less.

Figure 1A:
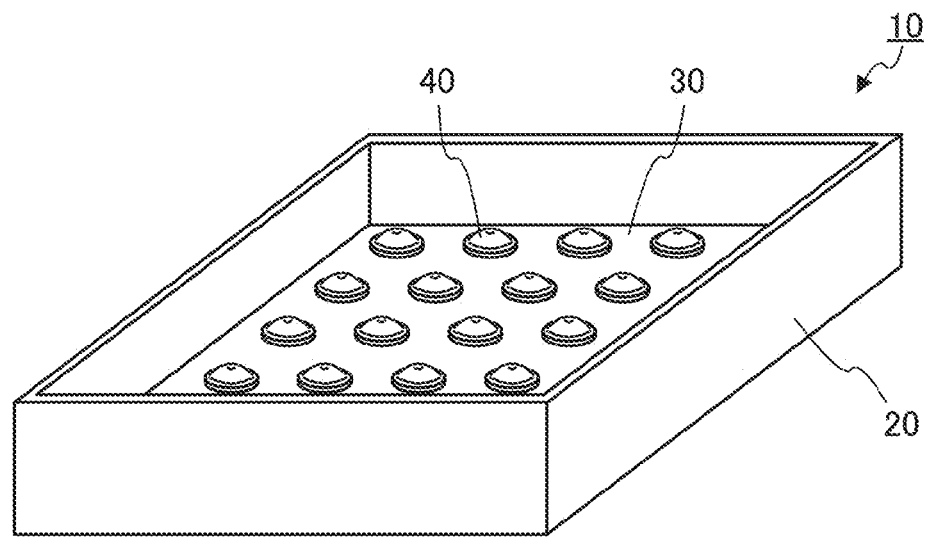
FIGS. 1A and 1B are drawings illustrating the configuration of a surface light source device (surface light emitting unit) set forth in PTL 1.
Figure 1B:
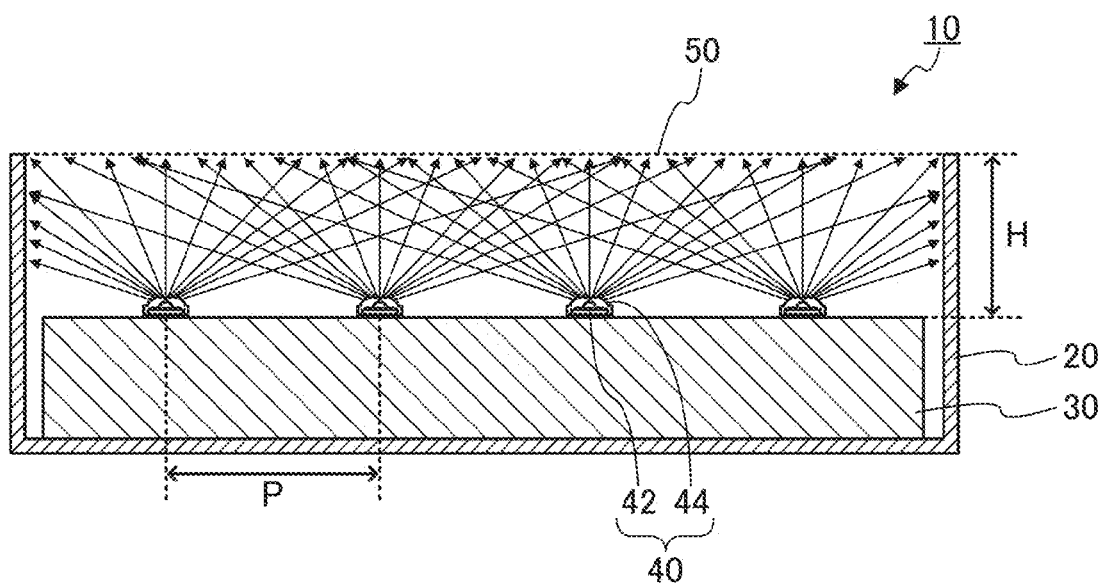
Figure 2:
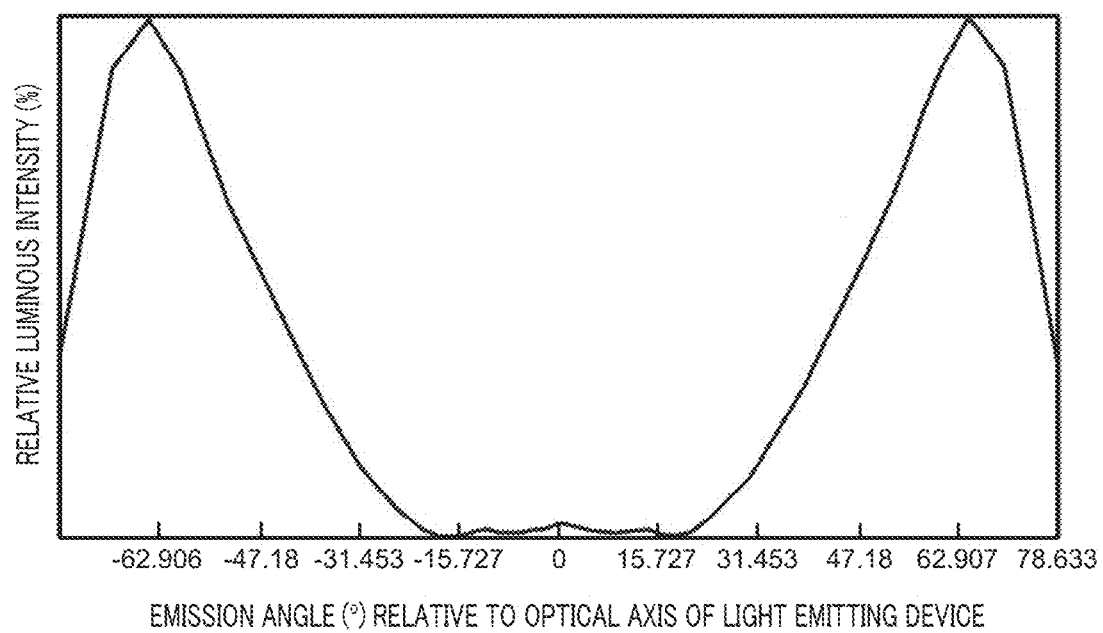
FIG. 2 is a graph illustrating the light distribution characteristics of a light emitting device (light emitting unit) set forth in PTL 1.
Figure 13:
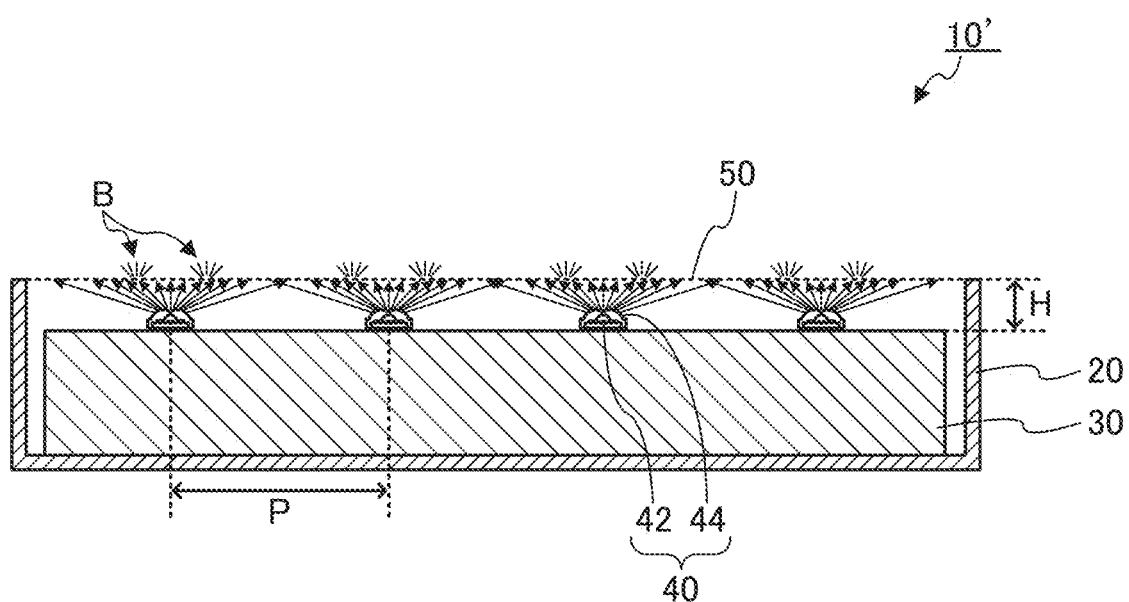
FIG. 13 is a sectional view illustrating an optical path in a surface light source device of the comparative example (H/P≤0.2, L/P≤1, $I_{1/2}/I_0$>6, $I_{1/4}/I_0$≤2.4)

It is noted that, when the surface light source device does not satisfy the aforementioned Equation 2, light emitted at a peak emission angle (e.g., 63°) from the light emitting device reaches an area between light emitting devices, of the lower surface of the light diffusion plate. Therefore, in surface light source device 10' (H/P≤0.2, L/P≤1, $I_{1/2}/I_0 > 6$, $I_{1/4}/I_0 \le 2.4$) not satisfying only the aforementioned Equation 2, as illustrated in FIG. 13, most of emission light from light emitting device 40 reaches an area in the vicinity of light emitting device 40 (area where light emitted at the peak emission angle reaches) of the light emitting surface, thereby causing the occurrence of an area with insufficient amount of light between light emitting devices 40 on the light emitting surface. As a result, bright part B that is relatively brighter is formed in an area in the vicinity of light emitting device 40 on the light emitting surface, resulting in luminance unevenness occurring (cf. FIG. 1B).

Figure 14A:
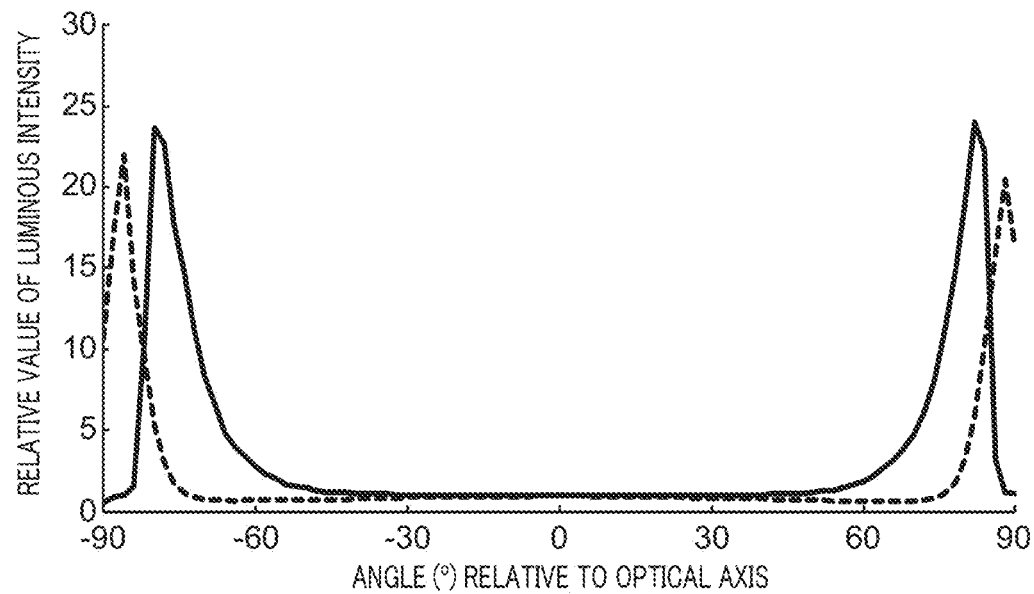
FIG. 14A is a graph illustrating the light distribution characteristics of a light emitting device to be used in a surface light source device of an embodiment of the present invention ($I_{1/2}/I_0$>6, $I_{1/4}/I_0$≤2.4) and the light distribution characteristics of a light emitting device to be used in a surface light source of a comparative example ($I_{1/2}/I_0$≤6, $I_{1/4}/I_0$≤2.4)
Figure 14B:
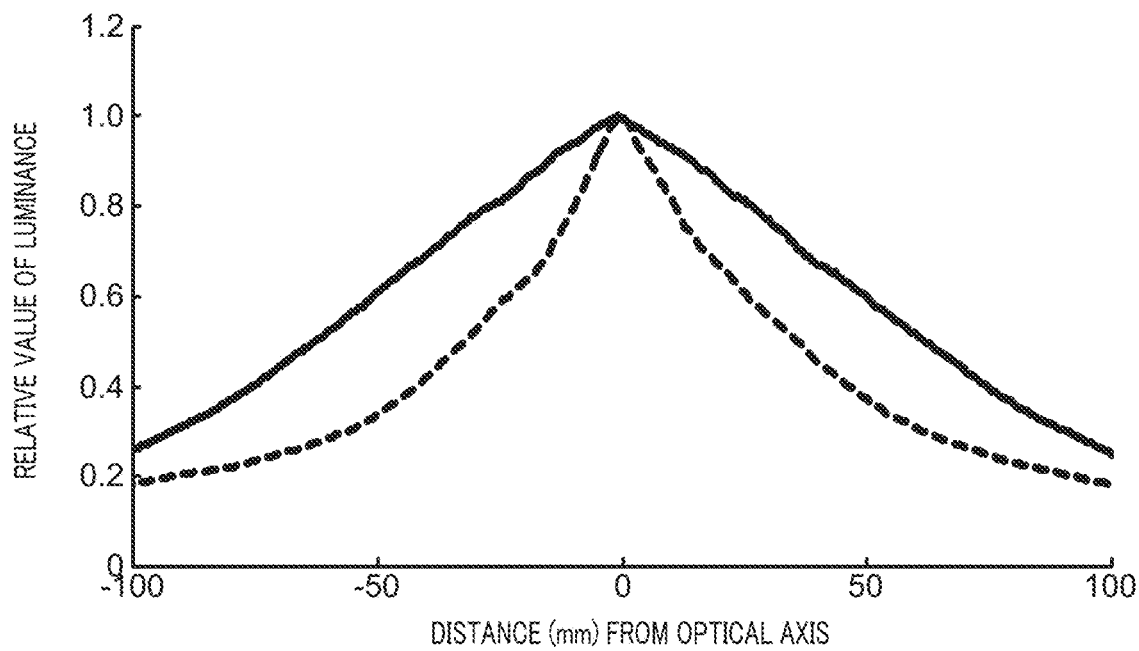
FIG. 14B is a graph illustrating the luminance distribution of a light emitting surface when only one light emitting device is lighted in the surface light source device of the embodiment of the present invention (H/P≤0.2, L/P>1, $I_{1/2}/I_0$>6, $I_{1/4}/I_0$≤2.4) and in the surface light source device of the comparative example (H/P≤0.2, L/P>1, $I_{1/2}/I_0$≤6, $I_{1/4}/I_0$≤2.4)
Figure 15:
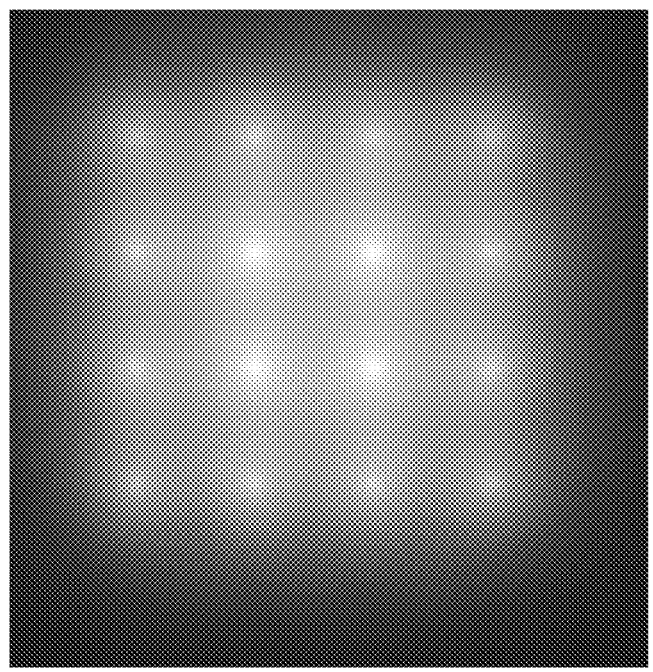
FIG. 15 is a drawing illustrating the luminance distribution of a light emitting surface of a surface light source device of the comparative example (H/P≤0.2, L/P>1, $I_{1/2}/I_0$≤6, $I_{1/4}/I_0$≤2.4)

Further, when the surface light source device does not satisfy the aforementioned Equation 3, the light distribution characteristics of the light emitting device are as indicated by a broken line in FIG. 14A. In FIG. 14A, a solid line is a curve showing the light distribution characteristics of light emitting device 130 (P110) according to the present embodiment. FIG. 14B is a graph illustrating the luminance distribution of the light emitting surface when only one light emitting device is lighted in a surface light source device having the light emitting device. In FIG. 14B, a broken line is a curve showing the luminance distribution of the light emitting surface of the surface light source device (H/P≤0.2, L/P>1, $I_{1/2}/I_0 \le 6$, $I_{1/4}/I_0 \le 2.4$) not satisfying only the aforementioned Equation 3, and a solid line is a curve showing the luminance distribution of the light emitting surface of surface light source device 100 (H/P≤0.2, L/P>1, $I_{1/2}/I_0 > 6$, $I_{1/4}/I_0 \le 2.4$) according to the present embodiment. Further, FIG. 15 is a luminance distribution of the light emitting surface when sixteen light emitting devices are lighted in the surface light source device (H/P≤0.2, L/P>1, $I_{1/2}/I_0 \le 6$, $I_{1/4}/I_0 \le 2.4$) not satisfying only the aforementioned Equation 3. From these results, it can be observed that, when a surface light source device does not satisfy the aforementioned Equation 3, an area between light emitting devices 40 of the light emitting surface becomes relatively darker, causing luminance unevenness to occur.

Figure 16A:
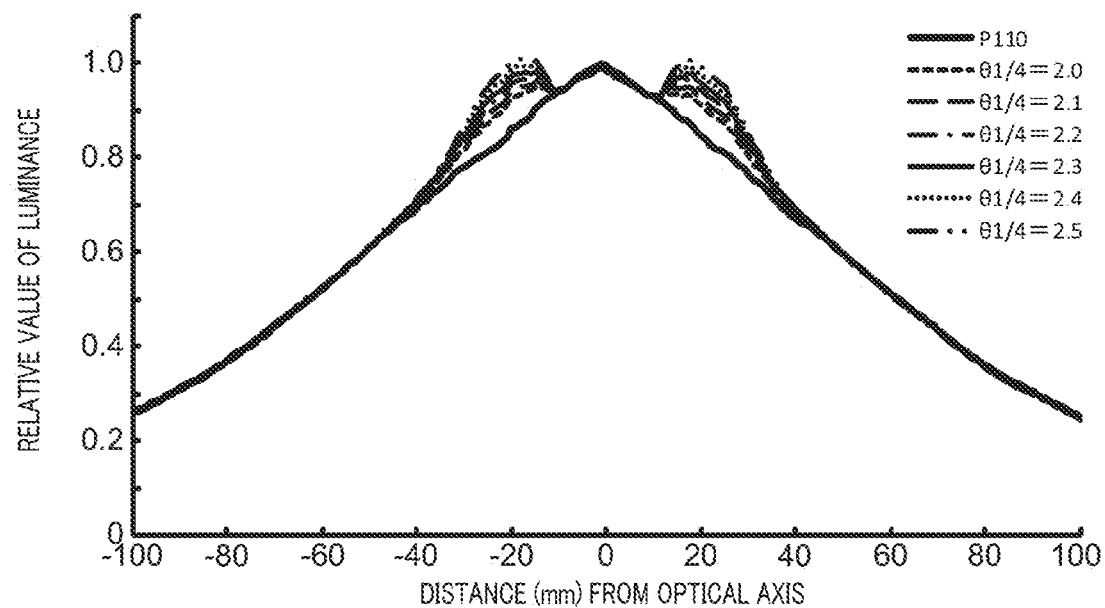
FIGS. 16A and 16B are graphs illustrating the luminance distribution of a light emitting surface when only one light emitting device is lighted in a surface light source device having light emitting devices, each of which has different values of $I_{1/4}/I_0$.
Figure 16B:
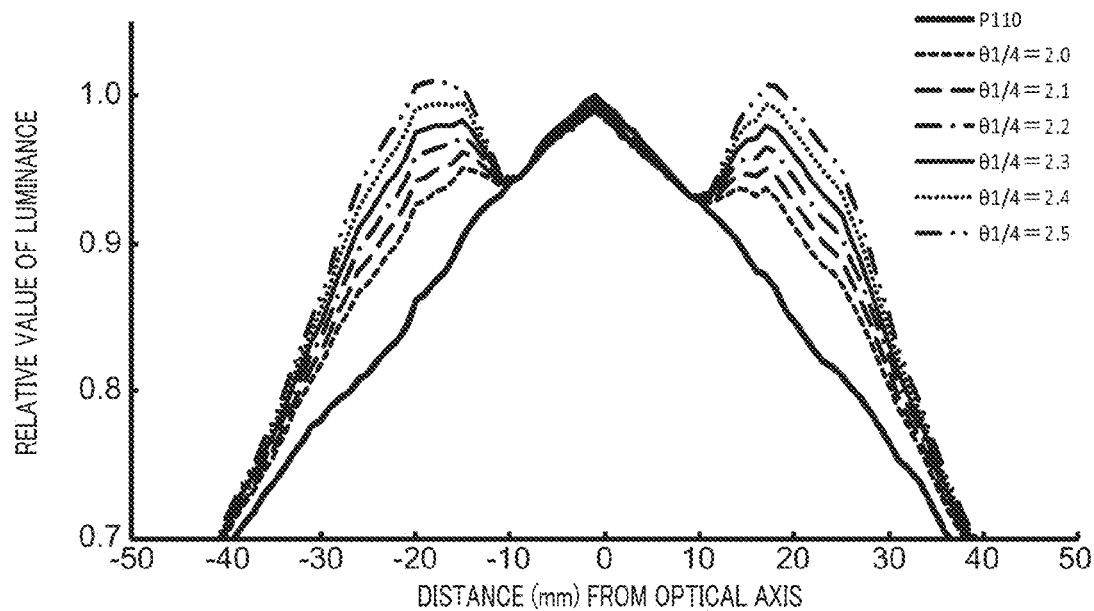

Further, even when the surface light source device does not satisfy the aforementioned Equation 4, if the aforementioned Equations 1 to 3 are satisfied, then luminance unevenness is sufficiently suppressed. However, when the surface light source device also satisfies the aforementioned Equation 4, the luminance distribution on the light emitting surface becomes more uniform. FIGS. 16A and 16B are graphs illustrating the luminance distribution of the light emitting surface when only one light emitting device is lighted in the surface light source device having light emitting devices, each of which has different values of $I_{1/4}/I_0$. FIG. 16B illustrates the peak portion in the graph of FIG. 16A in an enlarged manner. A solid line is a curve showing the luminance distribution of the light emitting surface of the surface light source device (H/P≤0.2, L/P>1, $I_{1/2}/I_0 > 6$, $I_{1/4}/I_0 = 1.6$) having light emitting device 130 (P110) according to the present embodiment. A thin broken line, a thin solid line, a thin dashed line and a thin chain double-dashed line are curves showing the luminance distributions of the light emitting surface of the surface light source devices (H/P≤0.2, L/P>1, $I_{1/2}/I_0 > 6$, $I_{1/4}/I_0 = 2.0$, 2.1, 2.2, 2.3, 2.4, 2.5) having other light emitting devices. The surface light source device having light emitting device 130 (P110) according to the present embodiment and the surface light source devices having other light emitting devices differ from each other only in the value of $I_{1/4}/I_0$. From these results, it can be observed that, when the value of $I_{1/4}/I_0$ varies, the luminance of an area in the vicinity of light emitting device 40, of the light emitting surface, varies. From the viewpoint of further equalizing the luminance distribution on the light emitting surface, the luminance of an area in the vicinity of light emitting device 40 is preferably lower than the luminance of a point directly above light emitting device 40.

Figure 17:
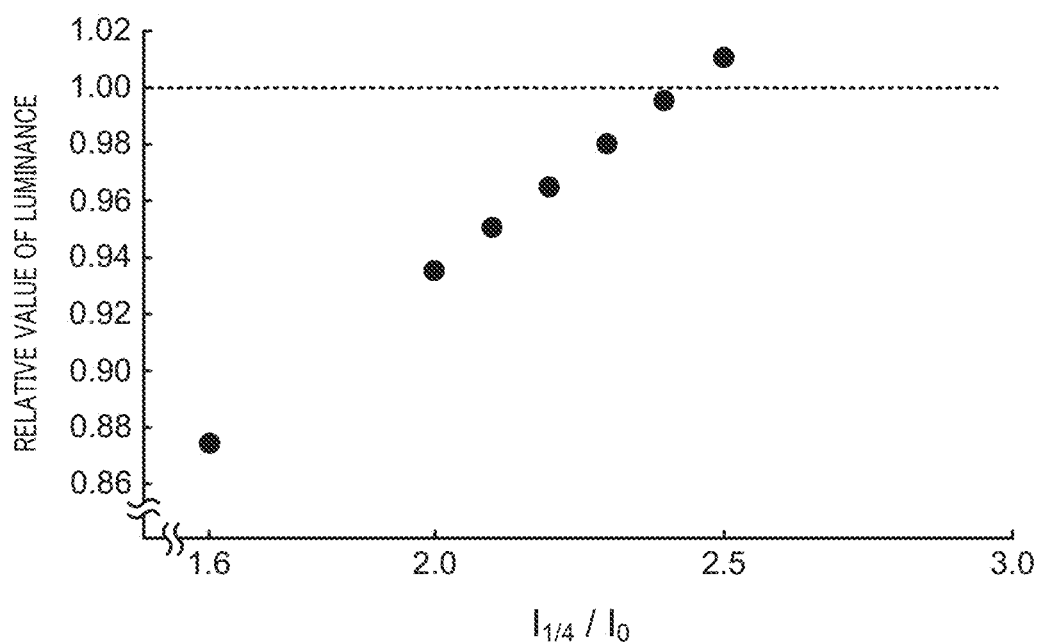
FIG. 17 is a graph illustrating the relationship between $I_{1/4}/I_0$ and the luminance of an area in the vicinity of a light emitting device.

FIG. 17 is a graph illustrating the relationship between $I_{1/4}/I_0$ and the luminance of an area in the vicinity of light emitting device 40. The ordinate indicates a luminance at a point 18 mm away from the optical axis of light emitting device 40 (point where the peak exists in the graph of FIG. 16A) on the light emitting surface, when the luminance of a point on the light emitting surface directly above light emitting device 40 is set to 1. From this graph, it can be observed that, when $I_{1/4}/I_0$ is 2.4 or less, the luminance of an area in the vicinity of light emitting device 40 becomes lower than the luminance of a point directly above light emitting device 40. Accordingly, from the viewpoint of further equalizing the luminance distribution on the light emitting surface, $I_{1/4}/I_0$ is preferably 2.4 or less.

INDUSTRIAL APPLICABILITY

The surface light source device according to the present invention is applicable, for example, to a back light of a liquid crystal display apparatus, a signboard, or a generally-used illumination apparatus.

REFERENCE SIGNS LIST 10, 10' Surface light source device (Surface light emitting unit)
20 Housing
30 Substrate (Mounting plate)

40 Light emitting device (Light emitting unit)
42 Light emitting element
44 Light flux controlling member (Lens part)
50 Light diffusion plate
100 Surface light source device
110 Housing
120 Substrate
130 Light emitting device
140 Light emitting element
150 Light flux controlling member
151 Incidence surface
152 Rear surface
153 Emission surface
153a First emission surface
153b Second emission surface
153c Third emission surface
154 Flange
155 Leg
160 Light diffusion plate
LA Optical axis of light emitting device

The invention claimed is:

1. A surface light source device comprising:
a substrate;
a plurality of light emitting devices, each of which includes a light emitting element, and a light flux controlling member that controls a distribution of emission light from the light emitting element, the light emitting devices being disposed at constant intervals on the substrate; and
a light diffusion plate disposed substantially parallel to the substrate over the plurality of light emitting devices, the light diffusion plate being configured to transmit light from each light emitting device while diffusing the light, wherein
in an angular range from a direction along an optical axis of the light emitting device to a direction of emission of light with the highest luminous intensity from the light emitting device, a luminous intensity of light from the light emitting device is gradually increased as an angle of the light relative to the optical axis becomes larger, and
the surface light source device is constructed such that following Equations 1, 2 and 3 are satisfied:

(Equation 1)

$$\frac{H}{P} \leq 0.2 \qquad [1]$$

(Equation 2)

$$\frac{L}{P} > 1 \qquad [2]$$

(Equation 3)

$$\frac{I_{1/2}}{I_0} > 6 \qquad [3]$$

where

P is a center-to-center distance between the light emitting devices adjacent to each other, H is an interval between an upper surface of the substrate and a lower surface of the light diffusion plate, L is a distance from an intersection point of the optical axis and the lower surface of the light diffusion plate to a point where the light with the highest luminous intensity reaches the lower surface of the light diffusion plate, $I_0$ is a luminous intensity of light emitted in the optical axis direction from the light emitting device, and $I_{1/2}$ is a luminous intensity of light emitted from the light emitting device toward a point of a distance P/2 from the intersection point of the optical axis and the lower surface of the light diffusion plate, on the lower surface of the light diffusion plate.

2. The surface light source device according to claim 1, wherein the surface light source device is constructed such that following Equation 4 is further satisfied:

(Equation 4)

$$\frac{I_{1/4}}{I_0} \leq 2.4 \qquad [4]$$

where $I_{1/4}$ is a luminous intensity of light emitted from the light emitting device toward a point of a distance P/4 from the intersection point of the optical axis and the lower surface of the light diffusion plate, on the lower surface of the light diffusion plate.

3. The surface light source device according to claim 2, wherein
the light flux controlling member includes an incidence surface that is a recessed internal surface disposed so as to face the light emitting element and that light emitted from the light emitting element enters, and an emission surface that is disposed so as to face the light diffusion plate and that emits light having entered the incidence surface while being controlled for a traveling direction of the light, and
the emission surface includes a first emission surface that is a recessed curved surface disposed at a position intersecting the optical axis, and a second emission surface that is a convex curved surface disposed around the first emission surface.

4. A display apparatus comprising:
the surface light source device according to claim 3; and
a member to be irradiated with light from the surface light source device.

5. A display apparatus comprising:
the surface light source device according to claim 2; and
a member to be irradiated with light from the surface light source device.

6. The surface light source device according to claim 1, wherein
the light flux controlling member includes an incidence surface that is a recessed internal surface disposed so as to face the light emitting element and configured to receive light emitted from the light emitting element, and an emission surface that is disposed so as to face the light diffusion plate and configured to emit light having entered the incidence surface with the light being controlled for a traveling direction of the light, and
the emission surface includes a first emission surface that is a recessed curved surface disposed at a position intersecting the optical axis, and a second emission surface that is a convex curved surface disposed around the first emission surface.

7. A display apparatus comprising:
the surface light source device according to claims 6; and
a member to be irradiated with light from the surface light source device.

8. A display apparatus comprising:
the surface light source device according to claim 1; and
a member to be irradiated with light from the surface light source device.

* * * * *